UNITED STATES PATENT OFFICE.

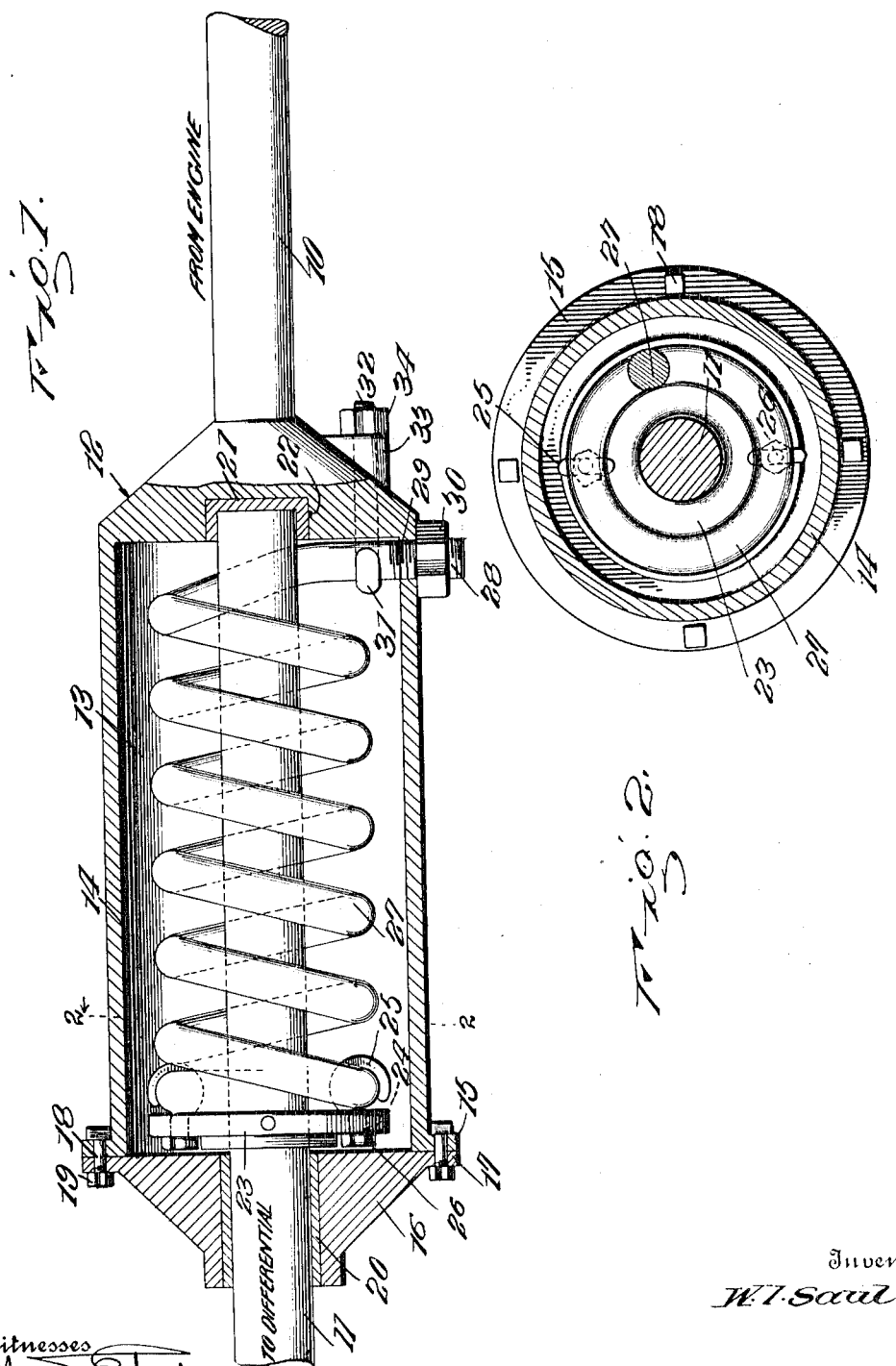

WILLIAM IRVING SAUL, OF CARROLL, IOWA.

YIELDABLE SHAFT-COUPLING.

1,118,586.      Specification of Letters Patent.      Patented Nov. 24, 1914.

Application filed December 28, 1912. Serial No. 739,133.

*To all whom it may concern:*

Be it known that I, WILLIAM IRVING SAUL, a citizen of the United States, residing at Carroll, in the county of Carroll and State of Iowa, have invented certain new and useful Improvements in Yieldable Shaft-Couplings, of which the following is a specification.

My invention relates to engine power equalizers and more particularly to equalizers of the above described character for use upon automobiles and self-propelled vehicles of all types, and the object of my invention is to provide a form of drive shaft by means of which the power transmitted from the engine to the differential gear of the automobile will be equalized to avoid sudden shocks and jars upon stopping and starting the vehicle.

A further object of my invention is to provide a sectional drive shaft, the sections of which are resiliently connected in such a manner as to effectively transmit all power of the engine, but to transmit this power gradually during the starting and stopping of the car, thus preventing all sudden movement of the car and consequent rocking of its frame, causing undue strain. This will also prevent spinning of the drive wheels when the power is applied and skidding of the wheels when the transmission brakes are suddenly applied, thereby saving considerable wear on the tires.

A further object of my invention is to construct a drive shaft of the above described character which will be equally as effective when the gears are reversed to back the car.

With these and other objects in view, my invention will be more fully described, illustrated in the accompanying drawing, and then specifically pointed out in the claim which is attached to and forms a part of this application.

In the drawing: Figure 1 is a fragmentary, central longitudinal section of my improved sectional drive shaft; Fig. 2 is a transverse section on the line 2—2 of Fig. 1.

Corresponding and like parts are referred to in the following description and indicated in all the views of the drawing by the same reference characters.

The drive shafts of automobiles and self-propelled vehicles in general, are usually formed in a single piece leading directly from the driving shaft of the transmission gearing to the drive pinion of the differential gearing.

My improved form of drive shaft comprises two shaft sections 10 and 11, the former of which is connected by one end to the driving shaft of the transmission gearing in the usual or any preferred manner, while the latter carries upon one end the drive pinion of whatever type of differential gearing is employed on the vehicle. The free end of the shaft 10 is enlarged to form a substantially frusto-conical head 12 provided with a longitudinal bore 13 forming a cylindrical shell or casing 14 considerably greater in diameter than the diameter of the shaft 10. The open end of this shell is provided with a radially extending flange 15, and a cap 16 normally closes the shell or casing, this cap having a radial flange 17 which engages against the flange 15 and by which the cap is secured in place, bolts 18 being passed through these engaging flanges and locked in place by nuts 19. This cap is formed with a central bore to receive a tubular bearing 20 for the shaft 11 which extends axially through the casing 14 and the free end of which is journaled in a bearing cup 21 seated in a counter-bore 22 formed in the integral head of the casing.

It will therefore be seen that the shafts 10 and 11 are held in axial alinement with each other but that either shaft is free to rotate independently of the other. A collar 23 is pinned, keyed or otherwise secured against both longitudinal and rotary movement upon the shaft 11 and immediately within the casing, this collar therefore serving to hold the shaft 11 with its inner end properly seated in the bearing cup 21. The peripheral flange portion of this collar is perforated at diametrically opposite points to receive the threaded shanks 24 of eyes 25, these eyes being firmly locked in place by nuts 26 threaded upon these shanks. These eyes engage about the terminal convolution of a stiff coiled spring 27 and effectively clamp one end of this spring against the collar and against turning movement independent thereof. The opposite end of this spring is directed radially from the body portion, threaded as shown at 28 and passed through an opening 29 formed in the wall of the casing adjacent the integral head thereof. A nut 30 threaded upon the outer end 28 of the spring firmly locks the same in place. To additionally secure this latter end of the spring, I provide an eye 31 having a threaded shank 32 which passes through the integral head of the casing, through a washer 33, having an inclined bearing face and which is secured in clamping position about the spring by a nut 34.

From the foregoing description, it will be apparent that the spring 27 is rigidly connected at one end to the shaft 11 and at its opposite end to the shaft 10 through the medium of the collar 23 and casing 14. This spring should, of course, be of sufficient strength to transmit all power applied to the drive shaft without danger of breaking and in normal or flexed position should occupy a position substantially that shown in Fig. 1 of the drawing, extending midway between the shaft 11 and the inner face of the casing.

In operation, upon the throwing in of the clutch to start the car, power from the engine will be transmitted to the section 10 of the drive shaft to rotate it and the casing carried by its end. As one end of the spring 27 is connected to this casing, the rotation of the shaft will have a torsional effect upon the spring and this effect will be gradually transmitted throughout the length of the spring to ultimately set the shaft section 11 in rotation, after which both shaft sections will rotate in unison. Upon throwing the clutch out of operation, the parts will return to normal position, the spring being again flexed. The strength and size of the spring should be such that when so tightened it will not bind about the shaft section 11.

On the other hand if the reverse gear is thrown in, the action will be the same, except that the spring will be turned in the opposite direction and the coil will be expanded a certain distance before the shaft section 11 will rotate. If the size and strength of the spring is properly proportioned with respect to the size of the casing 14 and to the power which is to be transmitted by the drive shaft, this unwinding of the coil or expanding of the same will not bring it into binding engagement with the casing and its action will therefore be uniform.

It will therefore be apparent that the limit of contraction of the spring will be when it has wound itself tightly about the rear shaft and the limit of expansion is when it has expanded to the walls of the cylinder. The spring therefore should be of sufficient tension to never reach either limit during the ordinary use of the car.

Although I have illustrated and described my invention in all its details it will of course be understood that changes in these details may be made at any time, if desired, without in the slightest degree departing from the spirit of my invention.

Having thus described the invention, what is claimed as new is:

An engine power equalizer including a sectional shaft, a casing carried by one terminal of one section and provided with bearings to receive one terminal of the other section, a collar arranged upon said other section and within the casing to maintain said section against withdrawal from the bearings of the casing, a helical spring positioned within the casing and wound about the second-mentioned section, hooks carried by the collar for detachably securing one terminal of the spring to the second-mentioned section, the other terminal of the spring being bent at right angles to its longitudinal axis and directed through the casing at the inner terminal thereof, the exteriorly disposed portion of the spring being threaded, a nut threaded on the exteriorly disposed portion of the spring, and a hook member extending through the casing and engaging the right angularly directed portion of the spring for holding it against displacement.

In testimony whereof I affix my signature in presence of two witnesses.

WILLIAM IRVING SAUL. [L. S.]

Witnesses:
J. P. MINSHULL,
E. N. NEU.